US012637146B2

(12) United States Patent
Durocher et al.

(10) Patent No.: US 12,637,146 B2
(45) Date of Patent: May 26, 2026

(54) ORIFICE SEAL SYSTEM

(71) Applicant: GM Global Technology Operations LLC, Detroit, MI (US)

(72) Inventors: Todd E. Durocher, Warren, MI (US); Christopher A. Michaels, Milford, MI (US); Christa F. Cooper, Warren, MI (US); Luke A. Reini, Spruce Pine, NC (US); Jeffrey W. Niemczak, Brighton, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 372 days.

(21) Appl. No.: 18/482,930

(22) Filed: Oct. 9, 2023

(65) Prior Publication Data

US 2025/0115307 A1     Apr. 10, 2025

(51) Int. Cl.
*B62D 25/24* (2006.01)
(52) U.S. Cl.
CPC .................................. *B62D 25/24* (2013.01)
(58) Field of Classification Search
CPC ...................................................... B62D 25/24
USPC ......................................... 296/1.06, 38, 154
See application file for complete search history.

(56) References Cited

U.S. PATENT DOCUMENTS

| | | | |
|---|---|---|---|
| 9,233,652 B2 | 1/2016 | Jatzke | |
| 9,889,729 B2 * | 2/2018 | Ko | ........................... B60J 10/80 |
| 10,385,941 B2 * | 8/2019 | Malone | ................. B62D 27/065 |
| 11,001,312 B2 * | 5/2021 | Kuhm | .................... B62D 25/24 |
| 2007/0062962 A1 * | 3/2007 | Iwahara | ................. B62D 25/24 |
| | | | 439/798 |

FOREIGN PATENT DOCUMENTS

| | | |
|---|---|---|
| DE | 3836018 A1 | 4/1990 |
| DE | 102013112629 A1 | 5/2015 |

* cited by examiner

*Primary Examiner* — Amy R Weisberg
(74) *Attorney, Agent, or Firm* — CANTOR COLBURN LLP

(57) ABSTRACT

A surface includes a first side defining a wet surface and a second side defining a dry surface. The second side is opposite the first side. The surface has an opening extending between the first side and the second side, and a seal system covering the opening. The seal system includes a flexible seal member insertable through the opening. The flexible seal member engages the wet surface. A tension member is connected to the flexible seal member. The tension member extends through the opening and is configured to apply a tension force to the flexible seal member to engage against the wet surface to close the opening.

20 Claims, 4 Drawing Sheets

ORIFICE SEAL SYSTEM

INTRODUCTION

The subject disclosure relates to seal systems and, more particularly, to a seal system that is inserted through an orifice from a dry surface to a wet surface.

Many structures include surfaces having openings that are exposed to various undesirable materials. The structures typically include a "wet surface" or the surface exposed to the undesirable materials and a "dry surface" or the surface opposite to the wet surface. In order to prevent the undesirable materials from entering the opening, a plug is installed into the opening. Traditionally, the plug is inserted through the opening from the wet surface. Unfortunately, there are structures having openings that are not readily accessible from the surface exposed to undesirable materials.

While sealing the dry surface may prevent the undesirable material from passing completely through the opening, there is nothing stopping penetration into the intermediate layers if present. That is, some of the undesirable materials may penetrate between adjacent intermediate layers and, over time, cause damage. Wicking from the wet surface to the dry surface of the structure can lead to crevasse corrosion and other failures. Accordingly, it is desirable to provide a system for sealing a wet surface of a structure when access is only available through the dry surface.

SUMMARY

A structural surface, in accordance with a non-limiting example, includes a first side defining a wet surface and a second side defining a dry surface. The second side is opposite the first side. The structural surface has an opening extending between the first side and the second side, and a seal system covering the opening. The seal system includes a flexible seal member insertable through the opening. The flexible seal member engages the wet surface. A tension member is connected to the flexible seal member. The tension member extends through the opening and is configured to apply a tension force to the flexible seal member to engage against the wet surface to close the opening.

In addition to one or more of the features described herein the flexible seal member is formed from an elastomer.

In addition to one or more of the features described herein the tension member includes a plurality of ratchet teeth and a pawl element that engages the plurality of ratchet teeth to hold the tension force in the tension member.

In addition to one or more of the features described herein the tension member includes a plurality of threads and a threaded fastener engaged with the plurality of threads, the threaded fastener being operable to engage the dry surface to create the tension force in the tension member.

In addition to one or more of the features described herein the tension member includes a rotatable cam element that is operable to apply the tension force in the tension member.

In addition to one or more of the features described herein a spacer having an aperture positioned in the dry surface aligned with the opening, the tension member extending through the aperture in the spacer.

In addition to one or more of the features described herein the structural surface is formed from a plurality of structural layers, one of the plurality of structural layers defining the dry surface and another of the plurality of structural layers defining the wet surface.

A vehicle, in accordance with a non-limiting example, includes a body defining a passenger compartment. The body includes a structural surface having a first side defining a wet surface and a second side defining a dry surface. The second side is opposite the first side. The structural surface has an opening extending between the first side and the second side. A seal system covers the opening. The seal system includes a flexible seal member insertable through the opening. The flexible seal member engages the wet surface. A tension member is connected to the flexible seal member. The tension member extends through the opening and is configured to apply a tension force to the flexible seal member to engage against the wet surface to close the opening.

In addition to one or more of the features described herein the flexible seal member is formed from an elastomer.

In addition to one or more of the features described herein the tension member includes a plurality of ratchet teeth and a pawl element that engages the plurality of ratchet teeth to hold the tension force in the tension member.

In addition to one or more of the features described herein the tension member includes a plurality of threads and a threaded fastener engaged with the plurality of threads, the threaded fastener being operable to engage the dry surface to create the tension force in the tension member.

In addition to one or more of the features described herein the tension member includes a rotatable cam element that is operable to apply the tension force in the tension member.

In addition to one or more of the features described herein a spacer having an aperture is positioned in the dry surface aligned with the opening, the tension member extending through the aperture in the spacer.

In addition to one or more of the features described herein the structural surface is formed from a plurality of structural layers, one of the plurality of structural layers defining the dry surface and another of the plurality of structural layers defining the wet surface.

In addition to one or more of the features described herein the dry surface forms a portion of the passenger compartment.

A seal system covering an opening in a structural surface having a wet surface and a dry surface, in accordance with a non-limiting example, includes a flexible seal member insertable through the opening. The flexible seal member engages the wet surface. A tension member is connected to the flexible seal member. The tension member extends through the opening and is configured to apply a tension force to the flexible seal member to engage against the wet surface to close the opening.

In addition to one or more of the features described herein the tension member includes a plurality of ratchet teeth and a pawl element that engages the plurality of ratchet teeth to hold the tension force in the tension member.

In addition to one or more of the features described herein the tension member includes a plurality of threads and a threaded fastener engaged with the plurality of threads, the threaded fastener being operable to engage the dry surface to create the tension force in the tension member.

In addition to one or more of the features described herein the tension member includes a rotatable cam element that is operable to apply the tension force in the tension member.

In addition to one or more of the features described herein a spacer having an aperture positioned in the dry surface aligned with the opening, the tension member extending through the aperture in the spacer.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
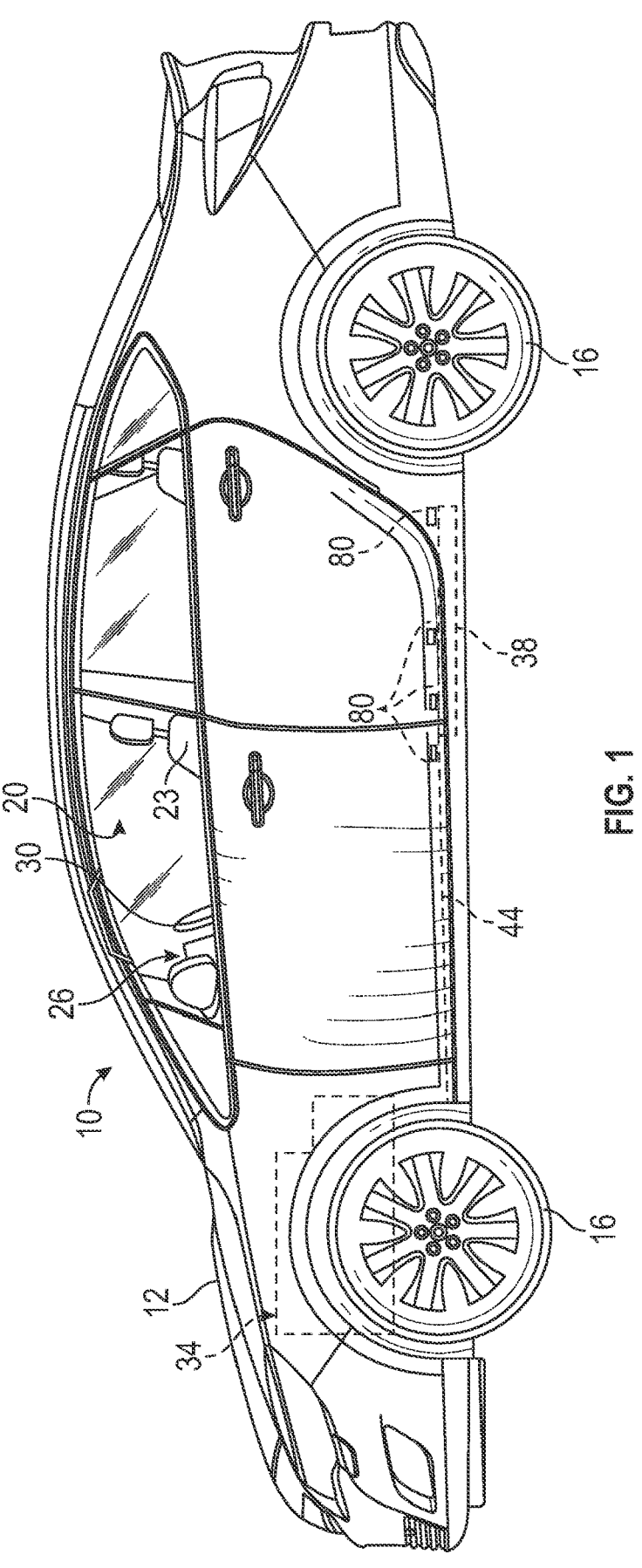
FIG. 1 is a left side view of a vehicle including an orifice seal system, in accordance with a non-limiting example.

The following description is merely exemplary in nature and is not intended to limit the present disclosure, its application or uses. It should be understood that throughout the drawings, corresponding reference numerals indicate like or corresponding parts and features.

A vehicle, in accordance with a non-limiting example, is indicated generally at 10 in FIG. 1. Vehicle 10 includes a body 12 supported on a plurality of wheels 16. Body 12 defines, in part, a passenger compartment 20 having seats 23 positioned behind a dashboard 26. A steering control 30 is arranged between seats 23 and dashboard 26. Steering control 30 is operated to control orientation of select ones of the plurality of wheels 16. Vehicle 10 includes an electric drive unit 34 that provides power to one or more of the plurality of wheels 16.

Figure 2:
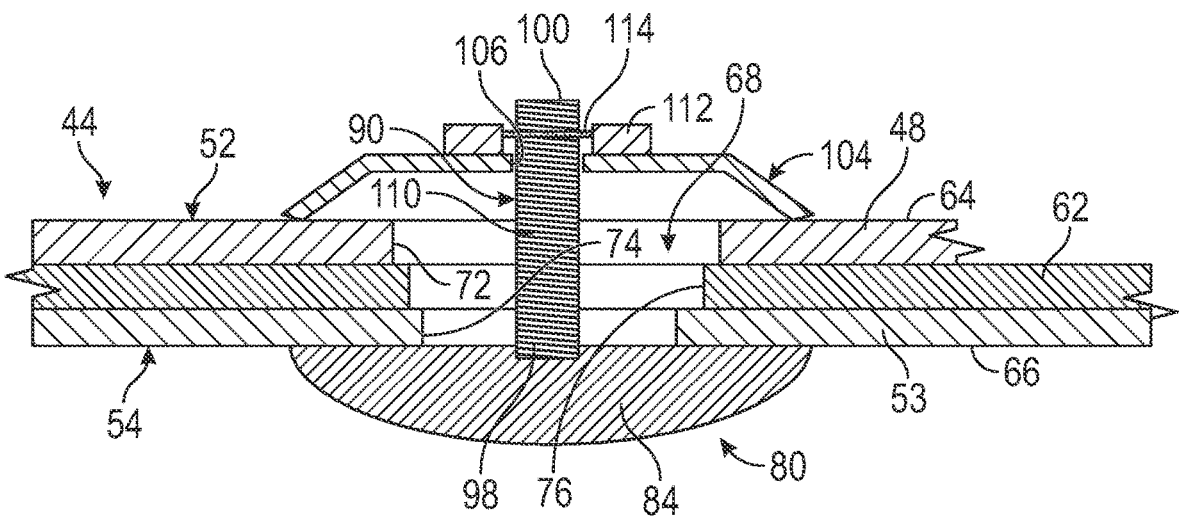
FIG. 2 is a cross-sectional side view of the orifice seal system closing an opening in a structure having a dry surface and a wet surface, in accordance with a non-limiting example.

A rechargeable energy storage system (RESS) or battery assembly 38 is arranged in body 12 and provides power to electric drive unit 34. In other arrangements, a fuel cell (not shown) may be used to provide power to electric drive unit 34. At this point, it should be understood that the location of electric drive unit 34 and battery assembly 38 may vary. As shown in FIG. 2 and with continued reference to FIG. 1, body 12 includes a structural surface 44 to which RESS 38 is mounted. The term "structural surface" should be understood to designate a surface of a structure. "Structural surface" is not mean to imply any specific structural, physical, or other attributes are associated with the surface. Structural surface 44 includes a first layer 48 having a first side 52 and a second layer 53 having a second side 54 that is opposite first side 52. First side 52 may be exposed to passenger compartment 20. Structural surface 44 may also include one or more intermediate layers 62.

In a non-limiting example, first side 52 defines an interior or dry surface 64 and second side 54 defines an exterior or wet surface 66. At this point. it should be understood that the term "wet surface" describes a surface exposed to contamination such as water, salts, dirt, and the like, while the term "dry surface" is protected from contamination. At this point, it should be understood that wet surface 66 and dry surface 64 may not define opposing sides of the same sheet or layer. Further, it should be understood that the number of layers and the thickness of each layer forming structural surface 44 may vary. Further, each layer may be formed from an identical material or multiple materials may be combined in different layers to form structural surface 44. Still further, interlayer sealing may or may not be present.

In a non-limiting example, an opening 68 extends through structural surface 44. Opening 68 is not accessible from wet surface 66. Opening 68 may represent a mounting location for an accessory or option not selected for vehicle 10 that may be covered by RESS 38. As such, it is beneficial to close opening 68 in order to prevent contaminates from passing into passenger compartment 20. It would also be beneficial to seal opening 68 from wet surface 66 in order to prevent interlayer contamination. In a non-limiting example, a seal system, 80 is inserted into opening 68 from dry surface 64 to seal against wet surface 66. Opening 68 may include a first opening portion 72 formed in first layer 48, a second opening portion 74 formed in second layer 53, and a third opening portion 76 formed in intermediate layer 62.

In a non-limiting example, opening portions 72, 74, and/or 76 may include a variety of shapes and need not be limited to circular openings. Further opening 68 may have various dimensions. That is, first opening portion 72 may include a first dimension at dry surface 64, second opening portion 74 may include another dimension at wet surface 66, and opening portion 76 may include yet another dimension at intermediate layer 62. Further, the first opening portion 72, second opening portion 74, and third opening portion 76 may or may not be coincident.

In a non-limiting example, seal system 80 includes a flexible seal member 84 connected to a tension member 90. Flexible seal member 84 may be formed from a variety of materials including elastomers and the like. That is, flexible seal member 84 may be formed from any flexible, resilient material that may be shaped to pass through opening 68 and subsequently reform. Tension member 90 includes a first end 98 connected to flexible seal member 84 and a second end 100. Tension member 90 may pass through a spacer 104 positioned on dry surface 64. Spacer 104 includes an aperture 106 that is smaller than opening 68. Aperture 106 is receptive of tension member 90. As will be detailed more fully herein, tension member 90 includes a plurality of ratchet teeth 110 that selectively engage with a pawl element 112 including a locking pawl 114.

Figure 3:
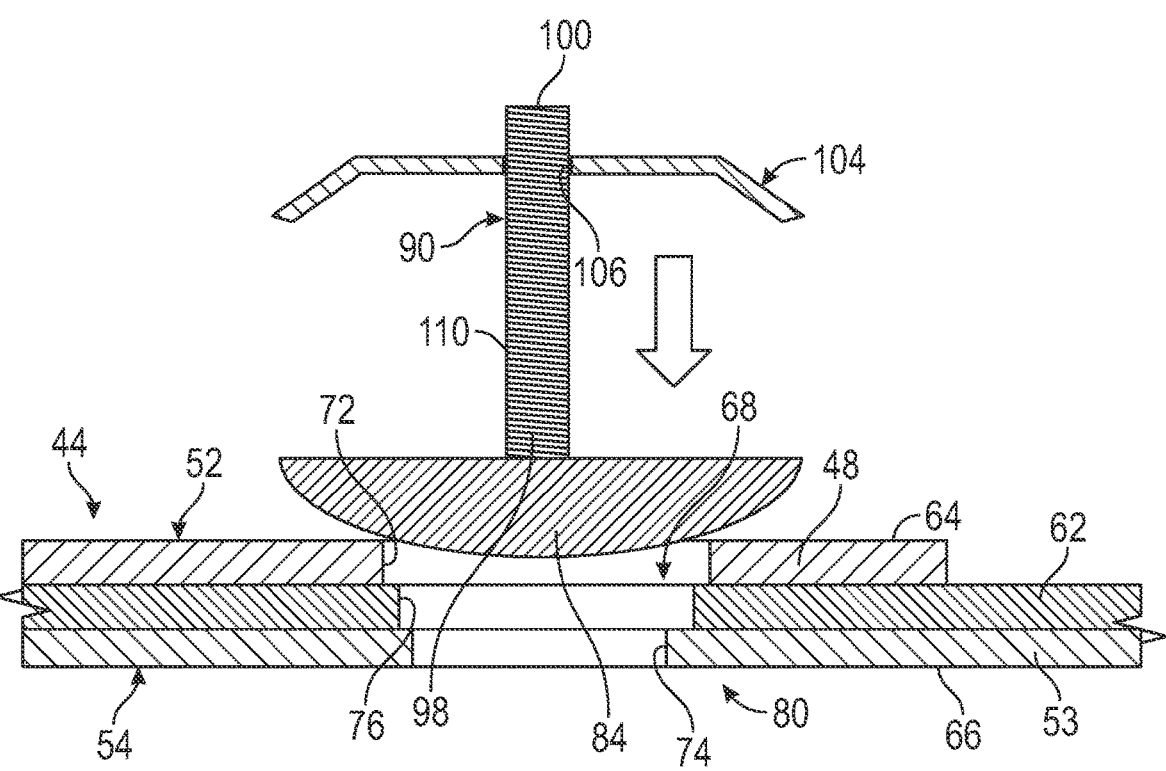
FIG. 3 is a cross-sectional side view of a seal of the seal system being aligned with an opening in the structure, in accordance with a non-limiting example.
Figure 4:
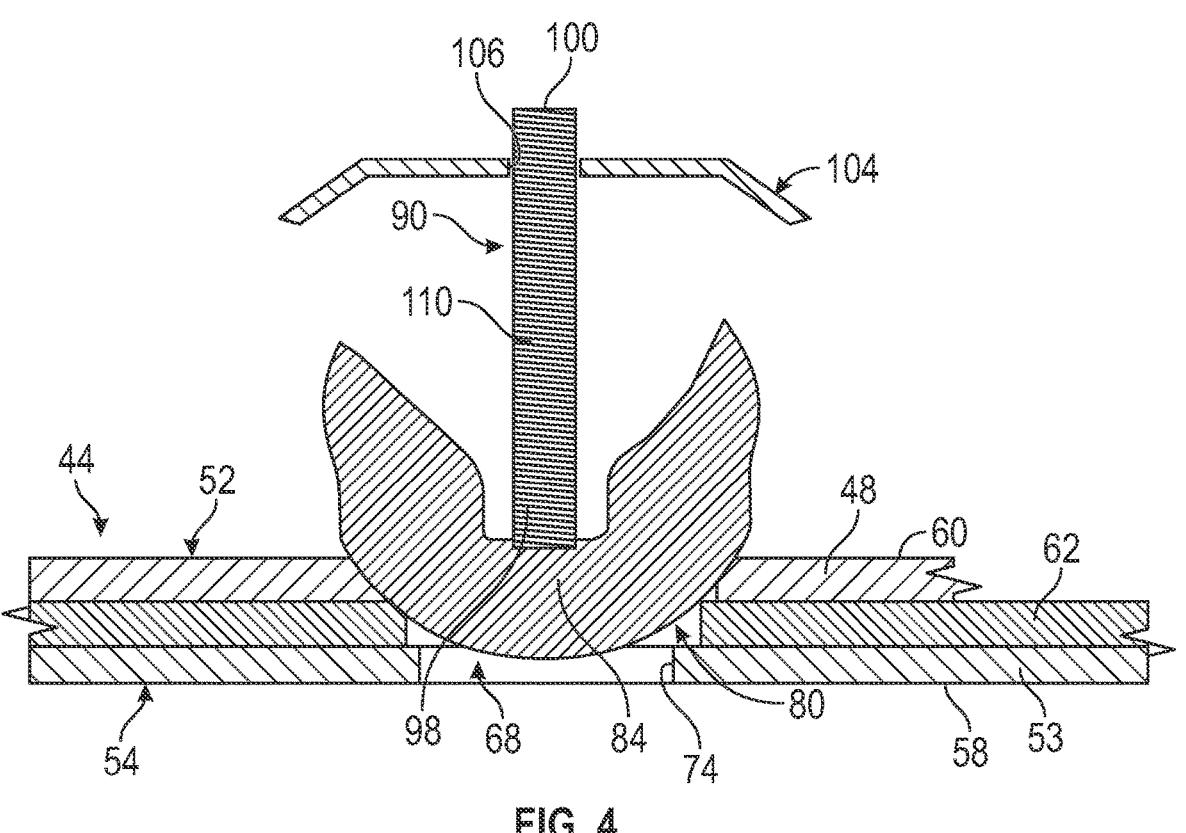
FIG. 4 is a cross-sectional side view of a seal of the seal system being inserted through the opening in the structure from the dry surface to the wet surface, in accordance with a non-limiting example.
Figure 5:
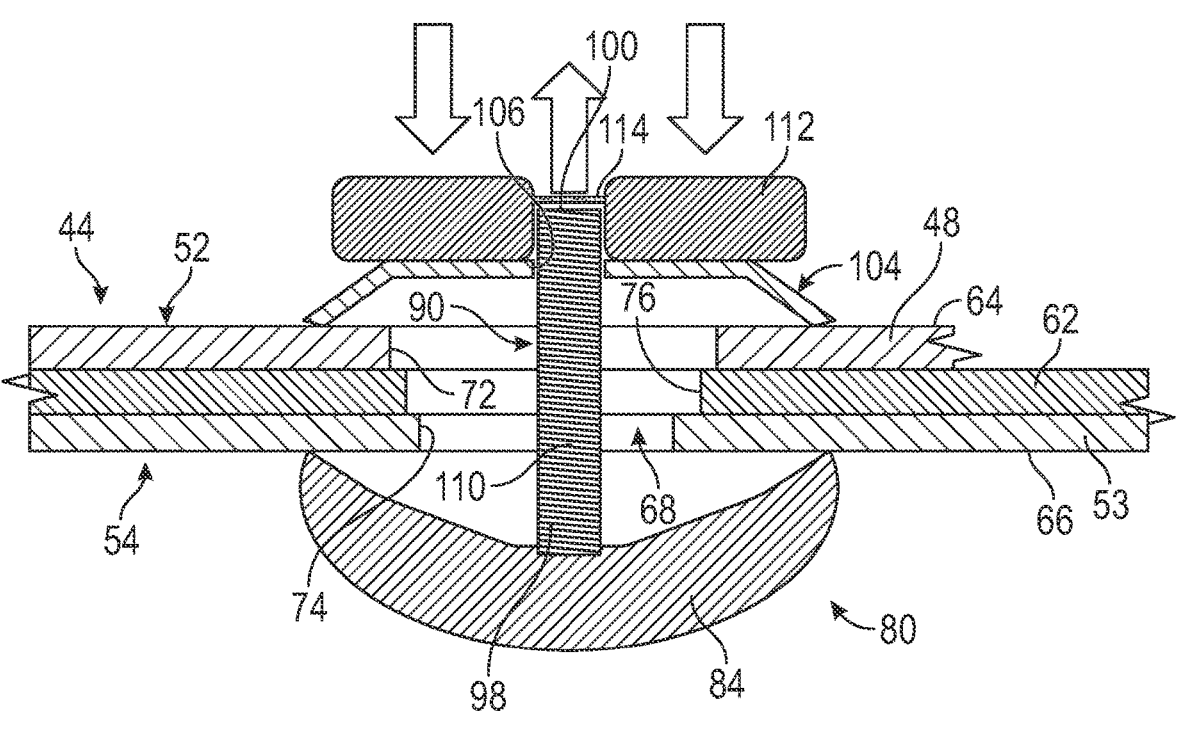
FIG. 5 is a cross-sectional side view of a seal of the seal system being pulled against the wet surface from the dry surface to close the opening in structure, in accordance with a non-limiting example.

In a non-limiting example, flexible seal member 84 is aligned with opening 68 at dry surface 64 as shown in FIG. 3. Flexible seal member 84 may then be pushed through opening 68 as shown in FIG. 4. Flexible seal member 84 deforms while passing through opening 68. Flexible seal member 84 reforms after being positioned adjacent wet surface 66 as shown in FIG. 5. At this point, a force may be applied to tension member 90 causing flexible seal member 84 to seal against wet surface 66 and close off opening 68 as shown in FIG. 2. The force applied to tension member 90 causes the plurality of ratchet teeth 110 to pass through pawl element 112 to engage locking pawl 114. Locking pawl 114 ensures that tension element 90 does not shift toward wet surface 66 in order to maintain closure over opening 68. In a non-limiting example, with seal system 80, opening 68 will withstand being submerged in one-half meter of water for at least 30 minutes without leaking.

Figure 6:
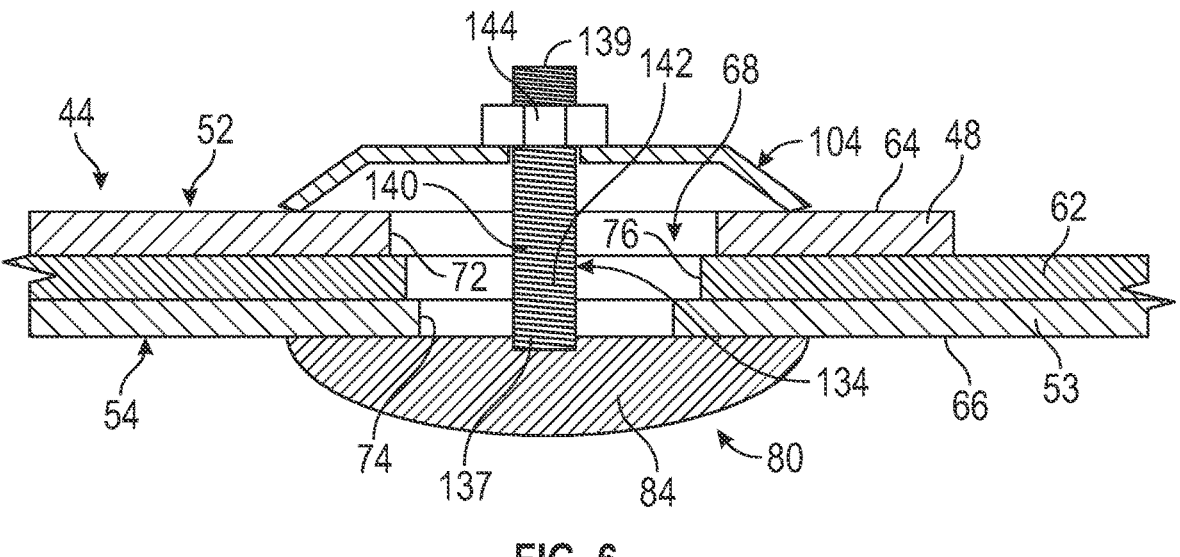
FIG. 6 is a cross-sectional side view of an orifice seal system closing an opening in the structure, in accordance with another non-limiting example.

Reference will now follow to FIG. 6, wherein like reference numbers represent corresponding parts in the respective views, in describing a tension member 134 in accordance with another non-limiting example. Tension member 134 includes a first end 137 connected to flexible seal member 84, a second end 139, and an intermediate portion 140. Intermediate portion 140 includes a plurality of threads 142. In a non-limiting example, a threaded fastener 144 is connected to second end 139 and engaged with the plurality of threads 142. Threaded fastener 144 is rotated so as to shift along intermediate portion 140 towards first end 137. Threaded fastener 144 may engage dry surface 60 or spacer 104. Continued rotation of threaded fastener 144 generates a tensile force in tension member 134 that pulls flexible seal 84 against wet surface 58 to close off opening 68.

Figure 7:
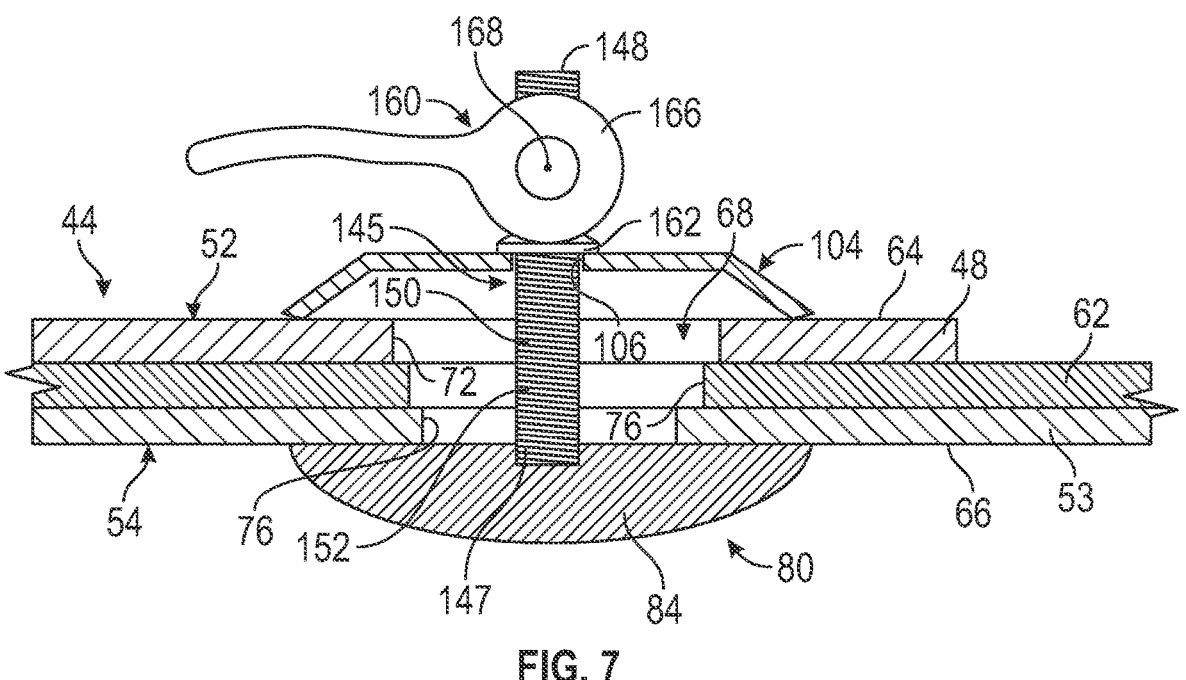
FIG. 7 is a cross-sectional side view of the orifice seal system closing the opening in the structure, in accordance with yet another non-limiting example.

Reference will now follow to FIG. 7, wherein like reference numbers represent corresponding parts in the respective views, in describing a tension member 145 in accordance with a non-limiting example. Tension member 145 includes a first end 147 connected to flexible seal member 84, a second end 148, and an intermediate portion 150. Intermediate portion 150 includes a plurality of threads 152. In a non-limiting example, a cam element 160 is threadably engaged with tension member 145. Cam element 160 includes a threaded fastener 162 connected to a cam member 164 having a cam surface 166 and an axis of rotation 168. Threaded fastener 162 engaged with the plurality of threads 152 on tension member 145.

Cam element 160 is connected to second end 148 and engaged with the plurality of threads 152. Threaded fastener 162 is rotated so as to cam member 164 along intermediate portion 150 towards first end 147. Cam member 164 may engage dry surface 60 or spacer 104. At this point, cam member 164 may be rotated about axis of rotation 168 such that cam surface 166 engages dry surface 60 or spacer 104 creating a tensile force in tension member 144 that pulls flexible seal 84 against wet surface 58 to close off opening 68.

At this point, it should be understood that the non-limiting examples described herein present various alternative arrangements for sealing an opening at a wet surface of a structure by introducing a seal from a dry surface of the structure. The seal system may be used in a structure formed from multiple layers as shown or from a single layer such that the wet surface and the dry surface are opposite sides of the same member. Further, while shown as sealing an opening in a vehicle structure, the non-limiting examples disclosed herein may be used in any situation where a wet surface seal is desired and access to the wet surface is limited.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A surface comprising:
   a first side defining a wet surface;
   a second side defining a dry surface, the second side being opposite the first side, a structural surface having an opening extending between the first side and the second side; and
   a seal system covering the opening, the seal system including a flexible seal member insertable through the opening, the flexible seal member engaging the wet surface, and a tension member connected to the flexible seal member, the tension member extending through the opening and being configured to apply a tension force to the flexible seal member to engage against the wet surface to close the opening,
   wherein the tension member includes a plurality of ratchet teeth and a pawl element that engages the plurality of ratchet teeth to hold the tension force in the tension member.

2. The surface according to claim 1, wherein the flexible seal member is formed from an elastomer.

3. The surface according to claim 1, wherein the tension member includes a plurality of threads and a threaded fastener engaged with the plurality of threads, the threaded fastener being operable to engage the dry surface to create the tension force in the tension member.

4. The surface according to claim 1, further comprising a spacer having an aperture positioned in the dry surface aligned with the opening, the tension member extending through the aperture in the spacer.

5. The surface according to claim 1, wherein the structural surface is formed from a plurality of structural layers, one of the plurality of structural layers defining the dry surface and another of the plurality of structural layers defining the wet surface.

6. A surface comprising:
   a first side defining a wet surface;
   a second side defining a dry surface, the second side being opposite the first side, a structural surface having an opening extending between the first side and the second side; and
   a seal system covering the opening, the seal system including a flexible seal member insertable through the opening, the flexible seal member engaging the wet surface, and a tension member connected to the flexible seal member, the tension member extending through the opening and being configured to apply a tension force to the flexible seal member to engage against the wet surface to close the opening, wherein the tension member includes a rotatable cam element that is operable to apply the tension force in the tension member.

7. The surface according to claim 5, wherein the plurality of structural layers comprises an intermediate layer between the one of the plurality of structural layers defining the dry surface and the another of the plurality of structural layers defining the wet surface.

8. A vehicle comprising:

a body defining a passenger compartment, wherein the body comprises the surface according to claim 1.

9. The vehicle according to claim 8, wherein the flexible seal member is formed from an elastomer.

10. The vehicle according to claim 8, wherein the tension member includes a plurality of threads and a threaded fastener engaged with the plurality of threads, the threaded fastener being operable to engage the dry surface to create the tension force in the tension member.

11. The vehicle according to claim 8, further comprising a spacer having an aperture positioned in the dry surface aligned with the opening, the tension member extending through the aperture in the spacer.

12. The vehicle according to claim 8, wherein the surface is formed from a plurality of structural layers, one of the plurality of structural layers defining the dry surface and another of the plurality of structural layers defining the wet surface.

13. The vehicle according to claim 12, wherein the plurality of structural layers comprises an intermediate layer between the one of the plurality of structural layers defining the dry surface and the another of the plurality of structural layers defining the wet surface.

14. The vehicle according to claim 8, wherein the dry surface forms a portion of the passenger compartment.

15. A vehicle comprising:

a body defining a passenger compartment, wherein the body comprises the surface according to claim 6.

16. A seal system covering an opening in a surface having a wet surface and a dry surface, the seal system comprising:

a flexible seal member insertable through the opening, the flexible seal member engaging the wet surface; and a tension member connected to the flexible seal member, the tension member extending through the opening and being configured to apply a tension force to the flexible seal member to engage against the wet surface to close the opening, wherein the tension member includes a plurality of ratchet teeth and a pawl element that engages the plurality of ratchet teeth to hold the tension force in the tension member.

17. The seal system according to claim 16, wherein the tension member includes a plurality of threads and a threaded fastener engaged with the plurality of threads, the threaded fastener being operable to engage the dry surface to create the tension force in the tension member.

18. The seal system according to claim 16, wherein the tension member includes a rotatable cam element that is operable to apply the tension force in the tension member.

19. The seal system according to claim 16, further comprising a spacer having an aperture positioned in the dry surface aligned with the opening, the tension member extending through the aperture in the spacer.

20. A vehicle comprising a plurality of the seal system of claim 16.

* * * * *